US005494074A

United States Patent [19]

Ramacier, Jr. et al.

[11] Patent Number: 5,494,074
[45] Date of Patent: Feb. 27, 1996

[54] QUICK CONNECTION COUPLING VALVE ASSEMBLY

[75] Inventors: Patrick J. Ramacier, Jr., St. Paul; David W. Meyer, Jordan, both of Minn.

[73] Assignee: Colder Products Company, St. Paul, Minn.

[21] Appl. No.: 217,453

[22] Filed: Mar. 24, 1994

Related U.S. Application Data

[63] Continuation-in-part of Ser. No. 967,157, Oct. 27, 1992, Pat. No. 5,316,041.

[51] Int. Cl.⁶ ........................................... F16L 37/28
[52] U.S. Cl. ............................. 737/614.04; 285/317
[58] Field of Search ........................... 251/284, 285, 251/60, 149.6; 137/614, 614.02, 614.03, 614.04, 614.05; 285/317; 156/73.5

[56] References Cited

U.S. PATENT DOCUMENTS

| B 490,589 | 2/1976 | Massey, Jr. ................... 251/284 X |
| 3,525,361 | 8/1970 | Cerbin et al. . |
| 4,436,125 | 3/1984 | Blenkush . |
| 4,501,407 | 2/1985 | Murray ............................. 251/284 X |
| 4,541,457 | 9/1985 | Blenkush . |
| 4,613,112 | 9/1986 | Phlipot et al. . |
| 4,703,957 | 11/1987 | Blenkush . |
| 4,763,683 | 8/1988 | Carmack ..................... 137/614.04 X |
| 4,909,477 | 3/1990 | Heiman ........................... 251/284 |
| 4,934,655 | 6/1990 | Blenkush et al. . |
| 4,944,977 | 7/1990 | Shantz et al. . |
| 5,033,777 | 7/1991 | Blenkush . |
| 5,052,725 | 10/1991 | Meyer et al. . |
| 5,080,133 | 1/1992 | Johnson et al. ................. 251/284 X |
| 5,090,747 | 2/1992 | Kotake . |
| 5,104,158 | 4/1992 | Meyer et al. . |
| 5,143,347 | 9/1992 | Lee et al. . |
| 5,316,041 | 5/1994 | Ramacier, Jr. et al. ........... 137/614.04 |

OTHER PUBLICATIONS

"Softube™ fittings", Colder Products Company product brochure, Form ST-1, Rev 2-691, (4 pages).
"Softube™ fittings", Colder Products Company product brochure, Form ST-1, 993, (4 pages).
"General Program", product brochure by Staubli SA, 03.90, (16 pages).
"CPC Quick Couplings for Plastic Tubing", Colder Products Company product brochure, Form CP-1, Rev 2 990, (36 pages).

Primary Examiner—Martin P. Schwadron
Assistant Examiner—Kevin L. Lee
Attorney, Agent, or Firm—Merchant, Gould, Smith, Edell, Welter & Schmidt

[57] ABSTRACT

A quick connection coupling valve assembly having a poppet member in both a male coupling member and female coupling member, a fluid passageway defined therethrough is opened by engaging the poppet members of the male and female coupling members with each other, the fluid passageway is closed by releasing a spring member to disengage the poppet members from each other. A plurality of longitudinal stops are disposed on an inside wall of the male and female coupling members. The stops limit movement of the poppet members.

12 Claims, 14 Drawing Sheets

QUICK CONNECTION COUPLING VALVE ASSEMBLY

This is a continuation in part application of Ser. No. 07/967,157 filed Oct. 27, 1992, U.S. Pat. No. 5,316,041.

FIELD OF THE INVENTION

The present invention relates to a quick connection coupling valve assembly. More particularly, the present invention relates to a quick connection coupling valve assembly having a male coupling member being locked in a female coupling member to provide a fluid passageway therethrough, and being released from the female coupling member to disconnect the fluid passageway.

BACKGROUND OF THE INVENTION

Various types of connection coupling valve assembly are known and disclosed in the art, such as connecting flexible tubes utilized in the bio-medical applications, instrument connection, fluid dispensing assembly, etc.

One concern with many current connection coupling valve assemblies is that it is difficult to quickly lock and release the connection coupling valve without any leakage of fluid in the fluid passageway.

In the medical industry or fluid dispensing industry, it is very desirable and critical to keep fluid containers sealed until the time of use. In many cases, it is desirable to have precise volumes of fluid dispensed without any leakage.

U.S. Pat. No. 4,436,125 discloses a quick connect/disconnect coupling assembly. A female coupling member includes a poppet valve assembly which functions as an automatic shut-off of the fluid passageway in the female coupling member when the female coupling member is not interconnected to the male coupling member.

U.S. Pat. No. 4,541,457 discloses a female coupling member including a two-way uncoupling valve assembly and a locking mechanism for cooperating with a male coupling member.

U.S. Pat. No. 4,934,655 discloses a shutoff valve assembly including a plunger and projections cooperating with each other to open or close the fluid passageway.

SUMMARY OF THE INVENTION

The present invention relates to a quick connection coupling valve assembly. More particularly, the present invention relates to a quick connection coupling valve assembly having a male coupling member being releaseably locked in a female coupling member to connect/disconnect a fluid passageway therein.

One embodiment of the present invention relates to a quick connection coupling valve assembly comprising a male coupling member having a front end and a back end, the male coupling member including a housing which reciprocally receives a poppet member therein and defines a fluid passageway therethrough, the poppet member having a tip end normally projecting from a front end of the housing, a spring member being compressedly disposed between a back end of the housing and the poppet member, the back end of the male coupling member being connectable to a fluid conduit.

In this embodiment of the present invention, the quick connection coupling valve assembly further comprises a female coupling member having a front end and a back end, the female coupling member including a housing defining a fluid passageway therethrough having first and second portions, the first housing portion reciprocally receiving a poppet member and the second housing portion receiving the first end of the male coupling member, said poppet member having a tip end normally projecting from a front end of the first housing portion, a spring member being compressedly disposed between a back end of the first housing portion and the poppet member, the back end of the female coupling member being connectable to a fluid conduit.

In this embodiment, the quick connection coupling valve assembly includes clip means proximate the front end of the female coupling member for releasably locking the male coupling member in the female coupling member.

In one embodiment, the poppet member includes a conical member disposed on a back side of the tip end, the poppet member further including a cylindrical portion where the spring member is received. The spring member is disposed in the poppet member such that fluid flow is through the inside or center of the spring member. Thus, coils of the spring member do not intervene with particulate which might be in the fluid flow.

In one embodiment, a first adaptor is welded to the back end of the housing of the male coupling member, and a second adaptor is welded to the back end of the first housing portion of the female coupling member, at least one flash trap is disposed between one end of the first adaptor and the back end of the male coupling member, and the second adaptor and the back end of the female coupling member, respectively.

In one embodiment, the clip means includes a one piece clip member and a spring member which is disposed between a surface of the female coupling member and a bottom surface of a tab portion of the clip member, the spring member being enclosed by the tab portion and at least one vertical wall of the female coupling member.

Further in one embodiment, the clip member is a one-piece plastic material.

In one embodiment, the clip member includes a lower edge having an inclined surface on a side facing the male coupling member and a vertical surface on a side facing away from the male coupling member. The male coupling member includes a circumferential flange having an inclined surface on a side facing the female coupling member and a vertical surface on a side facing away from the female coupling member. Accordingly, when the male coupling member is inserted into the female coupling member, the inclined surfaces cooperate to force the clip member downward. Once the flange of the male coupling member passes the clip member, the spring member forces the clip member upward and the vertical walls cooperate to retain the male and female coupling members in a locked state.

Yet in one embodiment, the tip end of the poppet member of the male coupling member is aligned with the tip end of the poppet member of the female coupling member. In addition, the tip ends of the poppets are engageable with each other to open fluid passageways of the male coupling member and the female coupling member when the valve assembly is locked by the clip means. Further, the tip ends of the poppets are disengaged from each other to close the fluid passageways of the male coupling member and the female coupling member when the male coupling member is disconnected from the female coupling member.

In one embodiment, a first o-ring is disposed on an outer surface at the front end of the male coupling member and forms a fluid tight seal between the male coupling member and the female coupling member.

In one embodiment, a second o-ring is disposed on an outer surface at a front end of the poppet members of the male/female coupling members and forms a fluid tight seal between the male coupling member and the female coupling member, respectively.

In a second embodiment of the valve assembly, the female coupling member and the male coupling member have elongated stops respectively on an inside wall of their housings. The stops limit movement of the poppet members respectively toward the front ends of their respective housings while allowing a fluid type seal to be formed by o-rings. Accordingly, the o-rings are protected not to be further squeezed so as to be easily worn out by a high fluid pressure toward the front ends. In addition, the poppet members respectively are truncated on the back side of the poppet members. The truncated portion provides small interference with fluid flow through the poppet members so that the fluid smoothly flows through the poppet members.

These and various other advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

BRIEF DESCRIPTION OF THE DRAWINGS

In the drawing in which like reference numerals and letters generally indicate corresponding parts throughout the several views.

DETAILED DESCRIPTION OF THE PREFERRED EMBODIMENTS

Figure 1:
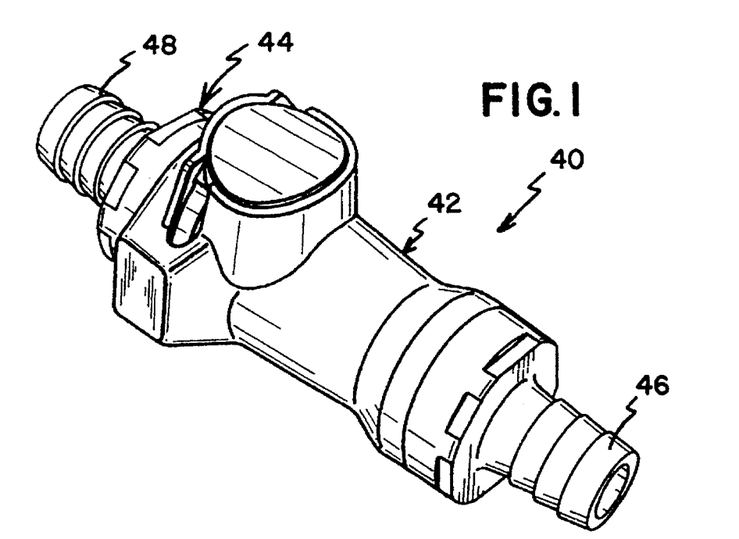
FIG. 1 is a perspective view of an embodiment of a quick connection coupling valve assembly generally in accordance with the principles of the present invention having a male coupling member and a female coupling member.

Referring to FIG. 1, there is shown an embodiment of a quick connection coupling valve assembly 40 generally in accordance with the principles of the present invention. The valve assembly 40 includes a female coupling member 42 and a male coupling member 44. The female coupling member 42 is welded to a fluid conduit adaptor 46 which is connected to a fluid conduit (not shown), such as a container or a tube, etc. The male coupling member 44 is welded to a fluid conduit adaptor 48 which is connected to a fluid conduit (not shown) as mentioned above. The fluid conduit adaptors 46,48 may have any kinds of configurations, such as a serrated bar adaptor, a threaded bar adaptor, etc. It will also be appreciated, the fluid conduits can be have any number of configurations.

Figure 2:
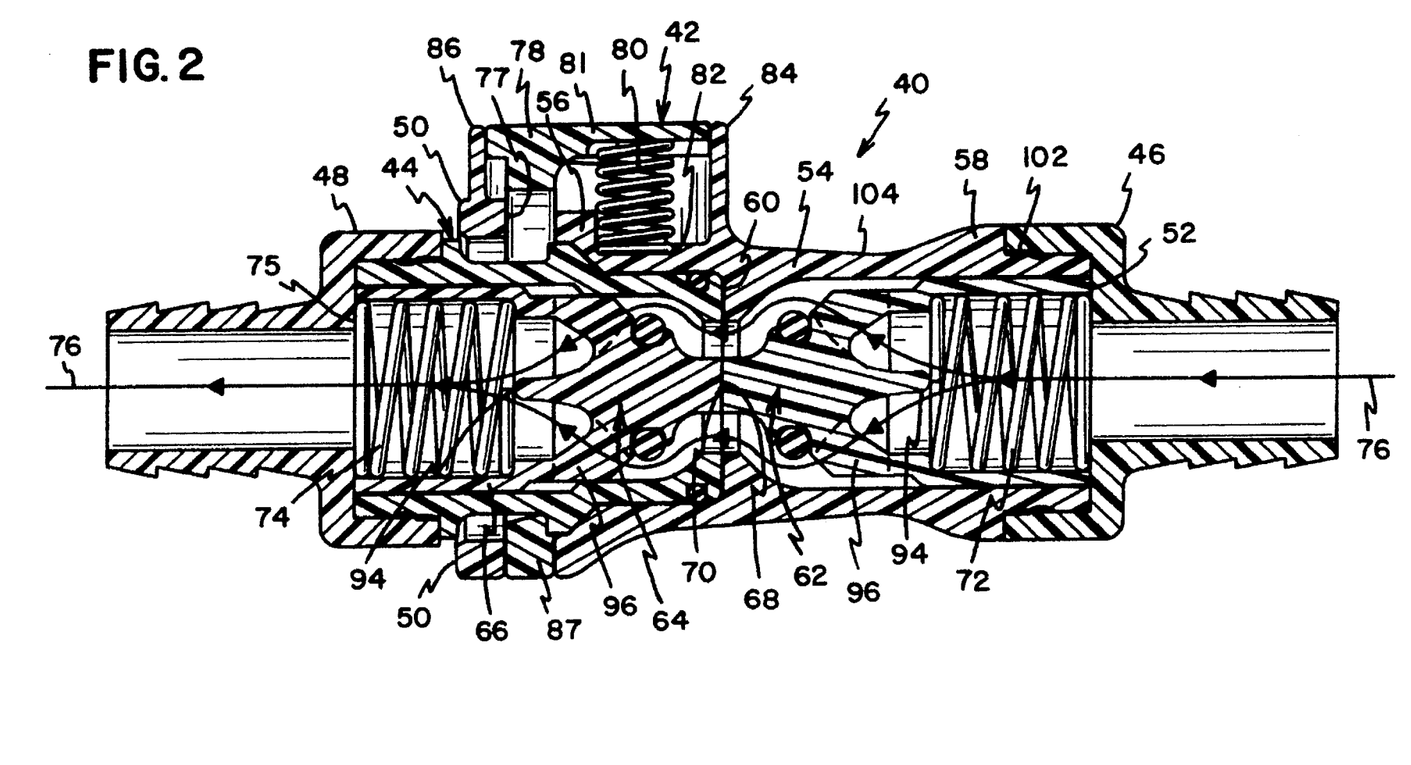
FIG. 2 is a cross-sectional view of the quick connection coupling valve assembly shown in FIG. 1.

Now referring to FIG. 2, a cross-sectional view of the valve assembly 40 is shown. The male coupling member 44 is inserted partially into the female coupling member 42 and is locked in place.

The female coupling member 42 has a front end 50 and a back end 52. A housing 54 defined in the female coupling member 42 includes a first housing portion 56 and a second housing portion 58. A front end 60 of the male coupling member 44 is received in the second housing portion 58.

Further in FIG. 2, a poppet member 62, which is reciprocally disposed in the first housing portion 56 of the female coupling member 42, is aligned with a poppet member 64 which is reciprocally disposed in a housing 66 of the male coupling member 44. A tip end 68 of the poppet member 62 and a tip end 70 of the poppet member 64 are engaged against each other thereby forcing each other in a backward direction so as to open a fluid passageway 76 between the female and male coupling members 42,44. A spring member 72 is compressedly received between the poppet member 62 and the back end 52 of the female coupling member 42. A spring member 74 is compressedly received between the poppet member 64 and a back end 75 of the male coupling member 44. Therefore, the spring members 72,74 will bias the poppet members 62,64 forward when the tip ends 68,70 are disengaged from each other as is the case when the male coupling member 44 is disconnected from the female coupling member 46. Upon being biased forward, the poppet members 62,64 will close and seal the fluid passageways through the female and male coupling members 42,44, respectively.

Figure 3:
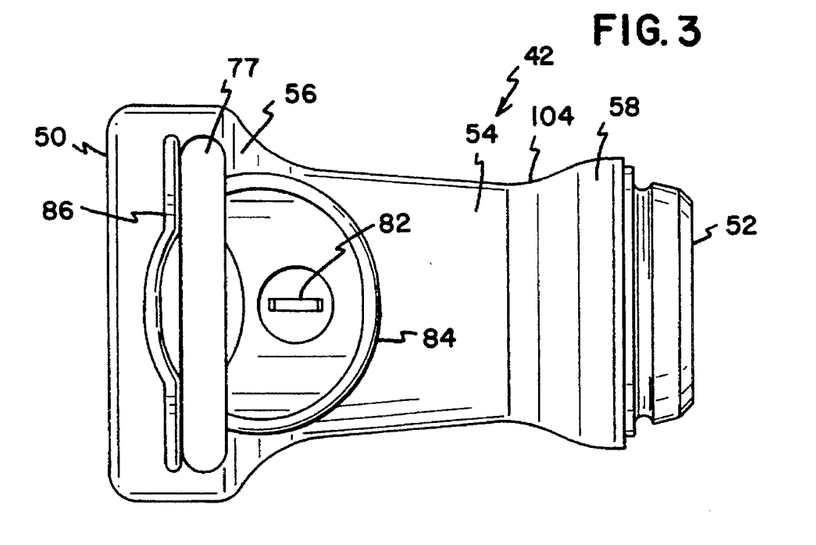
FIG. 3 is a top view of the female coupling member housing, a clip member and poppet being removed for purposes of illustration.
Figure 4:
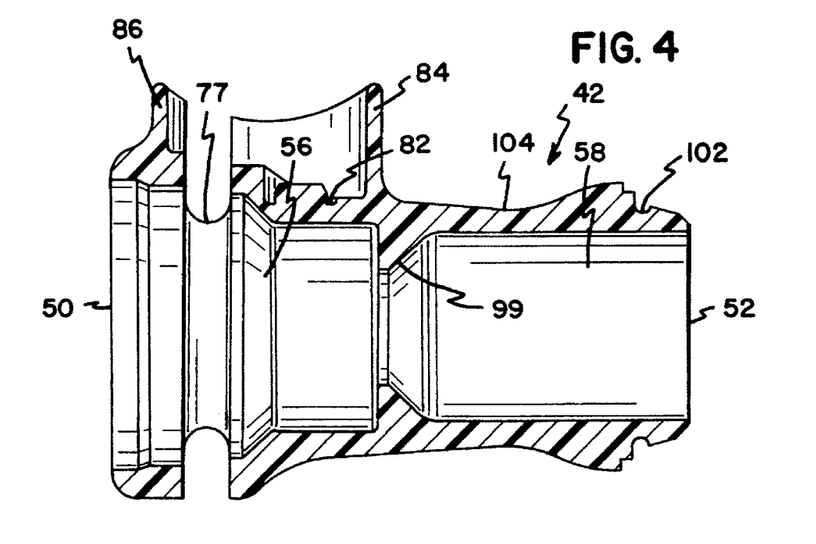
FIG. 4 is a side view of the female coupling member housing shown in FIG. 3.
Figure 13A:
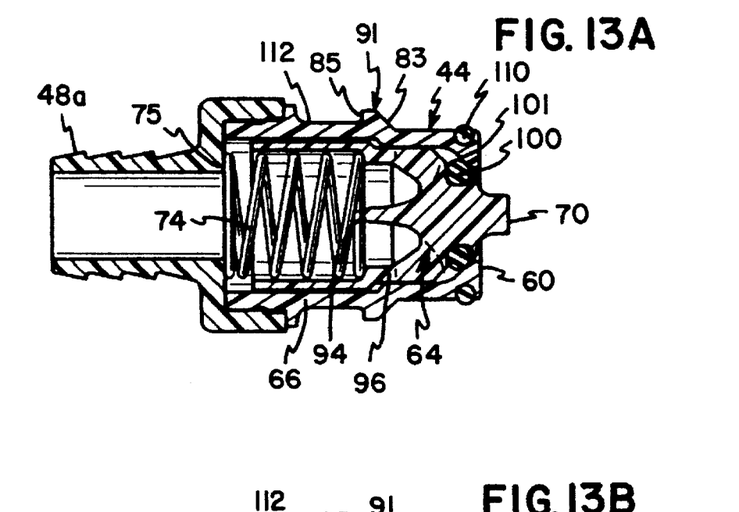
FIG. 13A is a cross-sectional view of the male coupling member with a first embodiment of a fluid conduit adaptor integrally welded to an end of the male coupling member.
Figure 13B:
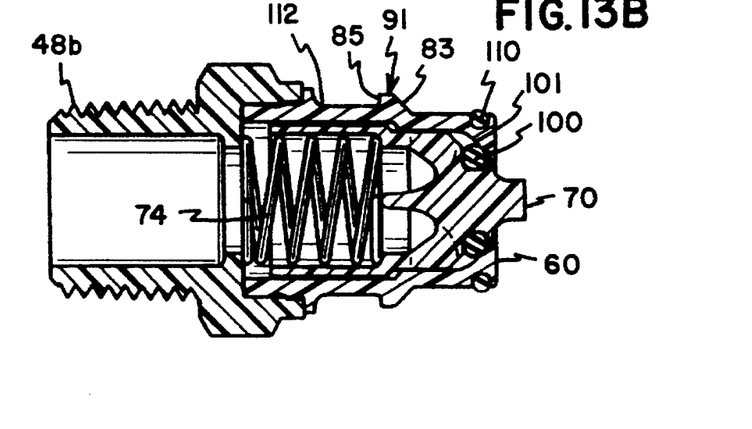
FIG. 13B is a cross-sectional view of the male coupling member with a second embodiment of a fluid conduit adaptor integrally welded to an end of the male coupling member.
Figure 13C:
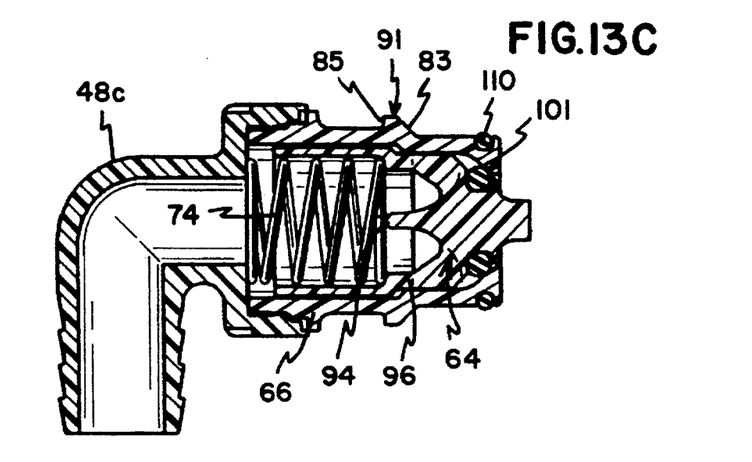
FIG. 13C is a cross-sectional view of the male coupling member with a third embodiment of a fluid conduit adaptor integrally welded to an end of the male coupling member.

Referring now to FIGS. 2–4, the second housing portion 58 of the female coupling member 42 has a clip member 78 received in a slot 77 disposed in its bottom and top portion. A spring member 80 is seated in an aperture 82 proximate the front end 50 of the female coupling member 42 beneath a tab portion 81 of the clip member 78. The spring member 80 is enclosed by the top horizontal tab portion 81 of the clip member 78 and two vertical side walls 84,86. Accordingly, the spring member 80 is not visible on the valve assembly 40. The clip member 78 further includes a vertical portion 87 having an opening which is frictionally received in the slot 77. A lower edge 69 of the vertical portion 87 normally projection into the fluid passageway. The lower edge 69 has an inclined surface 67 on a side facing the male coupling member 44 and a vertical surface 65 on a side facing away from the male coupling member 44. As shown in FIGS. 13A–C, the male coupling member 44 has a circumferential flange 91 having an inclined surface 83 on a side facing the female coupling member 42 and a vertical surface 85 on a side facing away from the female coupling member 42. Accordingly, when the male coupling member 44 is inserted into the female coupling member 42, the inclined surfaces of the clip member 78, lower edge 69 and the male coupling member flange cooperate to force the clip member downward. Once the flange 91 passes the lower edge 69, the clip member 78 is biased upward by the spring member 80. The vertical surface then cooperate to retain the female and male coupling members in a locked position. To release the female and male coupling members 42,44, the tab portion 81 of the clip member 78 is simply depressed. This forces the lower edge 69 of the clip member below the flange 91, thereby releasing the male coupling member 44 so that it can be removed from the female coupling member 42. To connect the female and male coupling members 42,44, the male coupling 44 is simply inserted into the female coupling member 42. An audible signal will occur when the clip member 78 slides upward and engages the flange 91 of the male coupling member 44 and locks it in place.

Furthermore, the clip member 78 is preferably made of one-piece plastic material. The housing portions of the female and male coupling members 42,44 are also preferably made of plastic. In a preferred embodiment, the clip member 78 has a different color than the housing portions so that the tap portion 81 can be readily distinguished from the rest of the valve assembly.

Figure 5:
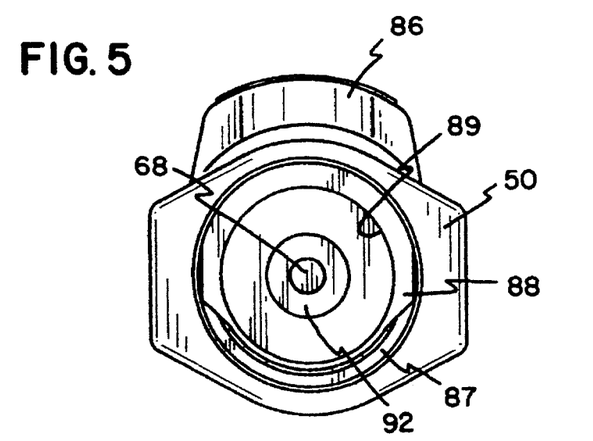
FIG. 5 is a front view of the female coupling member housing shown in FIG. 3.
Figure 16:
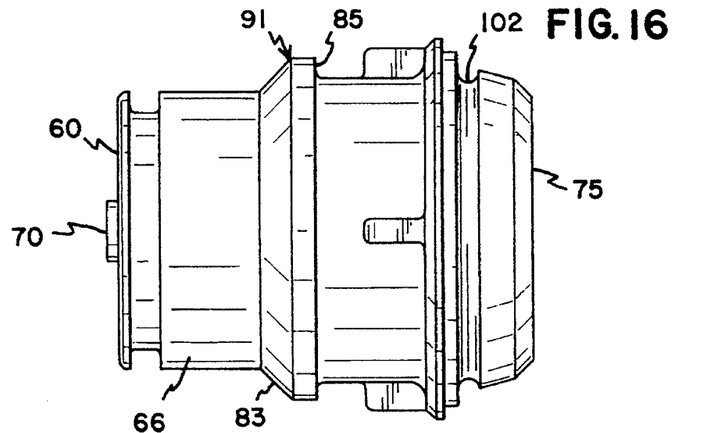
FIG. 16 is a side view of an embodiment of a male coupling member having a poppet member disposed therein.

Now referring to FIG. 5, a front end view of the female coupling member is shown. A cylindrical inclined wall 88 is disposed in an inner surface 89 of the female coupling member 42. The cylindrical inclined wall 83 (shown in FIG. 16) of the male coupling member 44 abuts with the cylindrical inclined wall 88 when the female coupling member 42 engages with the male coupling member 44 so that the fluid passageway is opened and there is no leakage between the cylindrical inclined wall 88 and the cylindrical inclined wall 90.

Figure 6:
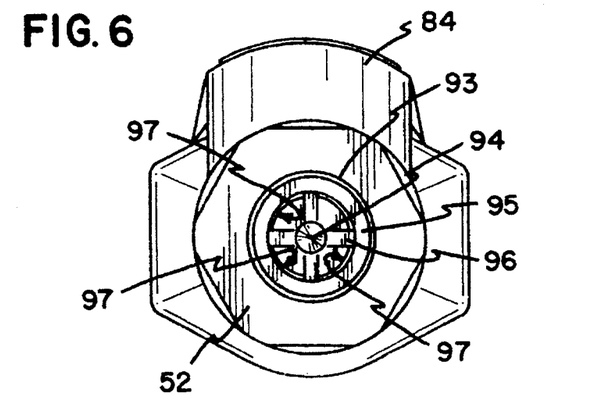
FIG. 6 is a back view of the female coupling member housing shown in FIG. 3.

FIG. 6 is shown a back end view of the female coupling member 42. A conical member 94 is disposed on a back side of the tip end 68 of the poppet member 62 which is also shown in FIG. 2. The conical member 94 provides minimal interference with fluid flow through the poppet member 62. The spring member 72 is received on a cylindrical surface 95 and is partially disposed within a cylindrical wall 93 of the poppet member 62. In addition, the poppet member 62 defines four openings 97 between four rib members 96. Accordingly, fluid flows through the poppet member 62.

Figure 7A:
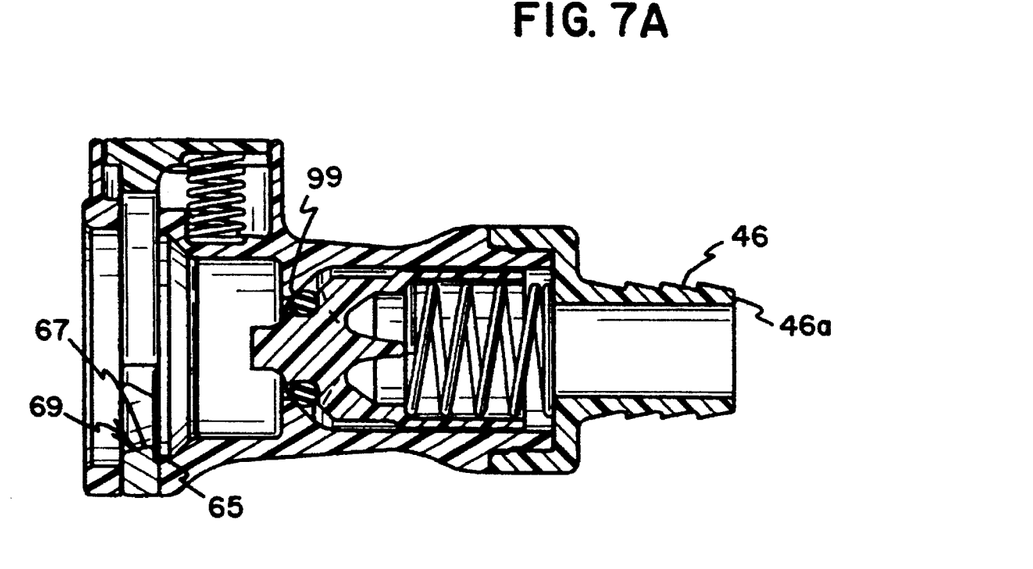
FIG. 7A is a cross-sectional view of the female coupling member having a first embodiment of a fluid conduit adaptor integrally welded to an end of the female coupling member.
Figure 7B:
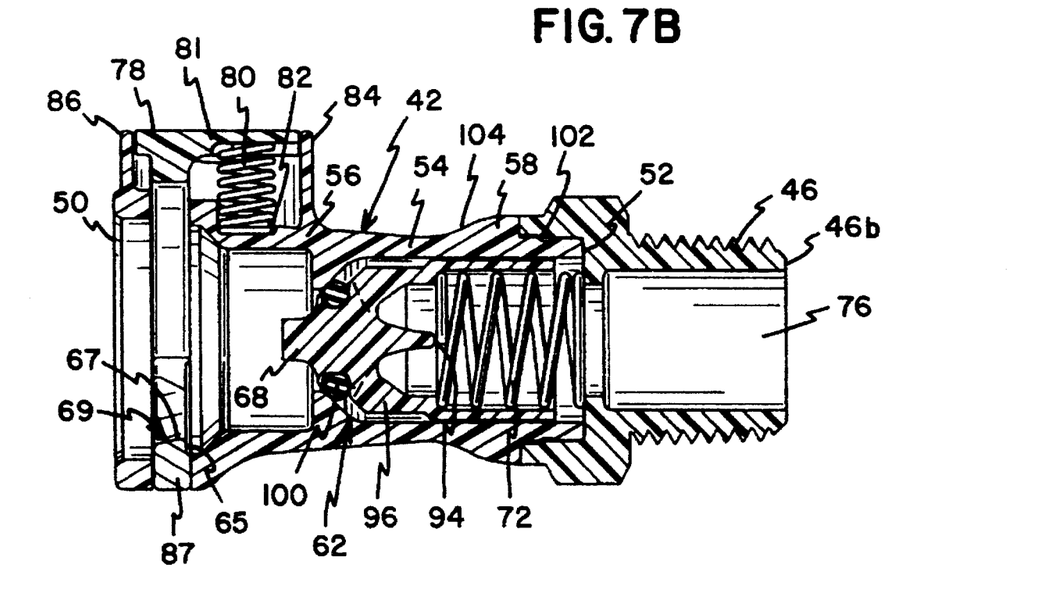
FIG. 7B is a cross-sectional view of the female coupling member having a second embodiment of a fluid conduit adaptor integrally welded to an end of the female coupling member.

Now referring to FIGS. 7A,B, cross-sectional views of the female coupling member 42 are shown. FIG. 7A shows a serrated fluid conduit adaptor 46 being affixed to the back end 52 of the female coupling member 42. FIG. 7B shows a threaded fluid conduit adaptor 46 being affixed to the back end 52 of the female coupling member 42. An o-ring 100 is disposed at an outer surface of the poppet member 62 of the female coupling member 42. The o-ring 100 forms a fluid tight seal between a surface 99 of the female coupling member 42 and the first housing portion 56.

Figure 8:
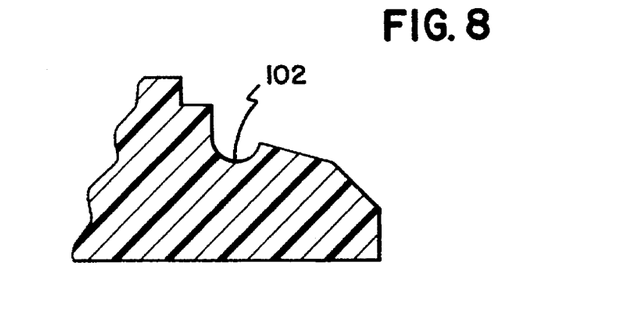
FIG. 8 is an enlarged partial sectional view of a flash trap on the female coupling member.

Now referring to FIG. 8, an enlarged view of a flash trap 102 is disposed on an outer surface 104 at the back end 52 of the female coupling member 42. The flash trap 102 is designed to collect extra material when the fluid conduit adaptor 46 is thermally welded to the back end 52 of the female coupling member 42 so that the fluid conduit adaptor 46 has a good connection with the female coupling member 42.

Figure 9:
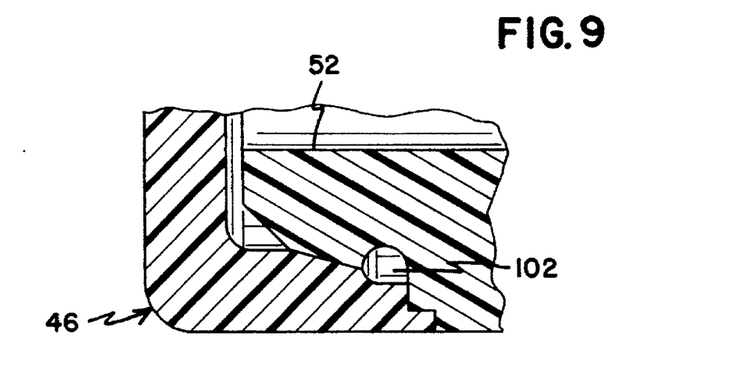
FIG. 9 is an enlarged view of a connection of the female coupling member and the fluid conduit adaptor proximate the flash trap of the female coupling member.

Referring to FIG. 9, an enlarged view of the connection between the fluid conduit adaptor 46 and the female coupling member 42 is shown. The flash trap 102 is defined between the fluid conduit adaptor 46 and the female coupling member 42 so that when the welded attachment is made thermally, expanded materials fill into the flash trap 102 so as to form a good sealing therebetween.

Figure 10:
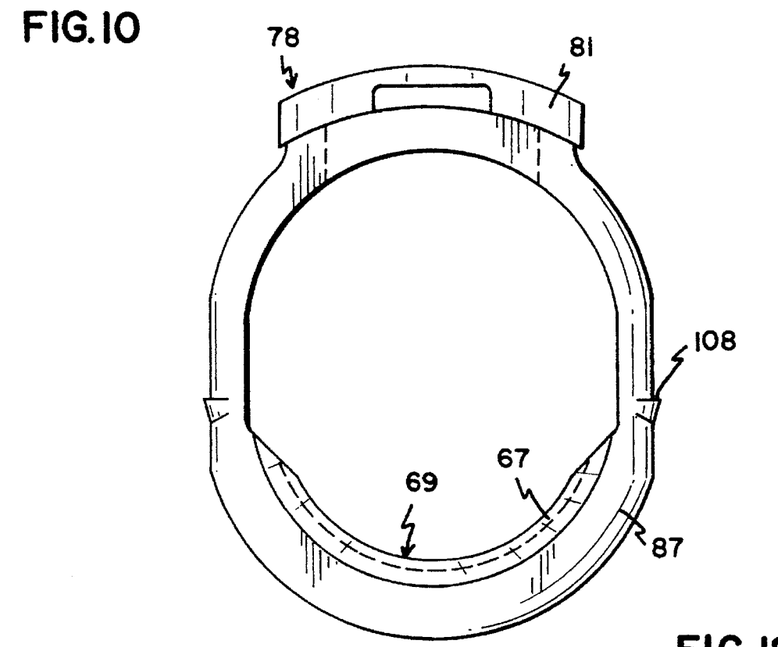
FIG. 10 is a back view of a clip member of the female coupling member.
Figures 11, 12:
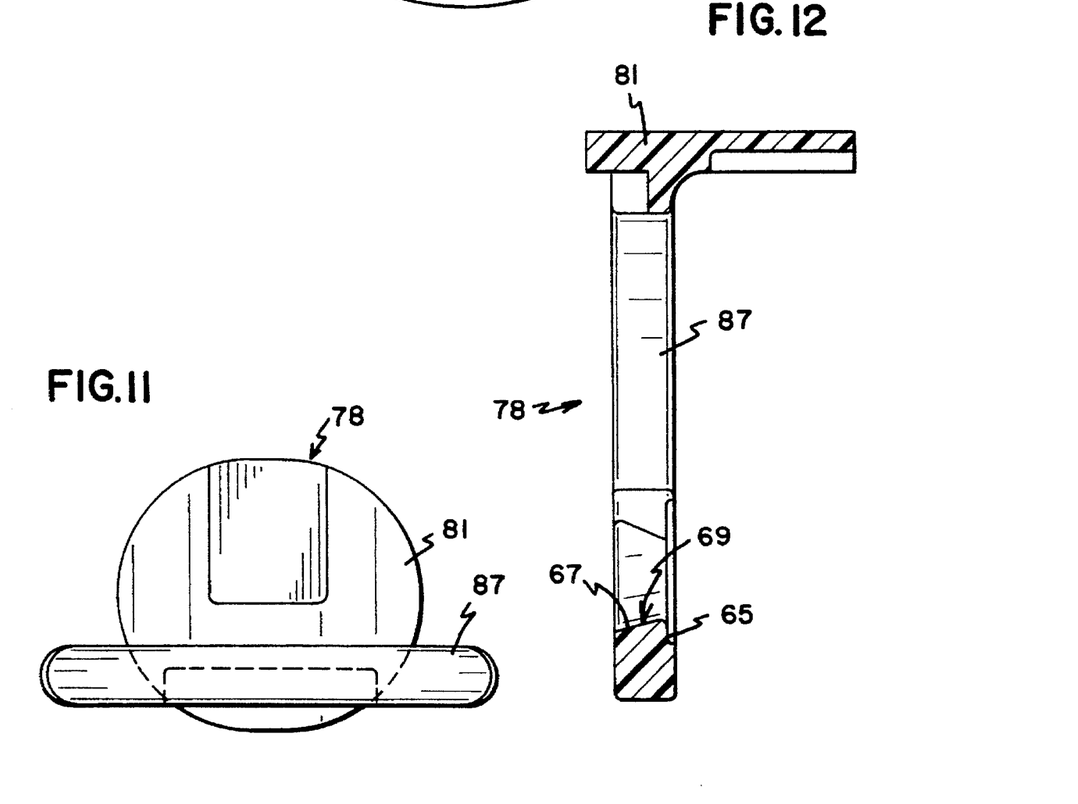
FIG. 11 is a bottom view of the clip member of the female coupling member.
FIG. 12 is a cross-sectional view of the clip member of the female coupling member.

Now referring to FIGS. 10, 11 and 12, a back end view, a bottom side view and a sectional view of the clip member 78 are shown. The inclined wall 67 and the vertical wall 65 are disposed at the lower edge 69 of the vertical portion 87. In addition, two ribs 108 are projected from sides of the vertical portion 87 of the clip member 78. The ribs 108 engage with side wall portions of the slot 77 so that the clip member 78 does not fall out and is retained at all times with the female coupling member 42.

Now referring to FIGS. 13A–C, cross-sectional views of the male coupling member 44 are shown. In FIG. 13A, the poppet member 64, which has the same configuration as the poppet member 62 of the female coupling member 42, is received in the housing 66 of the male coupling member 44. The spring member 74 is compressedly disposed between the conical member 94 of the poppet member 64 and the back end of the housing 66 of the male coupling member 44. The o-ring 100 is also disposed on an outer surface of the poppet member 64 at the front end 60 of the housing 66 so as to form a fluid tight seal between an inner surface 101 of the male coupling member 42 and the housing 66. Therefore, when the tip end 70 of the poppet member 64 is pushed away from the front end 60 toward the back end 75 as is-the case when the male coupling member 44 engages the female coupling member 42, the fluid passageway 76 is opened. When the female and male coupling members 42,44 are disconnected, the compressed spring member 74 forces the poppet member 64 forward into engagement with the surface 101 to stop the fluid from flowing outside of the housing 66. Another o-ring 110 is disposed on an outer surface of the housing 66. The o-ring 110 forms a fluid tight seal between the male coupling member 44 and the female coupling member 42. Illustrated in FIGS. 13A–C, are three different embodiments 48a,b,c of the fluid conduit adaptor 48. In FIG. 13A, the serrated fluid conduit adaptor 48a is integrally welded to the back end 75 of the male coupling member 44. In FIGS. 13B, 13C, the threaded fluid conduit adaptor 48b and the right-angle serrated fluid conduit adaptor 48c are integrally welded to the back end 75 of the male coupling member 44, respectively.

Figure 14:
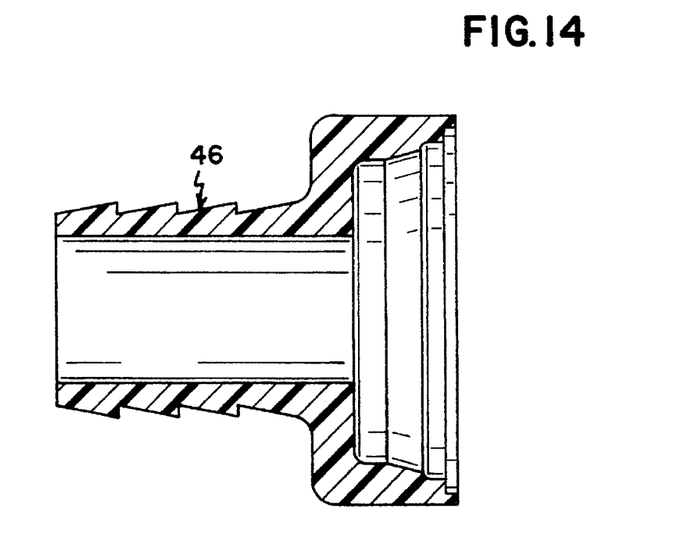
FIG. 14 is a cross-sectional view of a fluid conduit adaptor.
Figure 15:
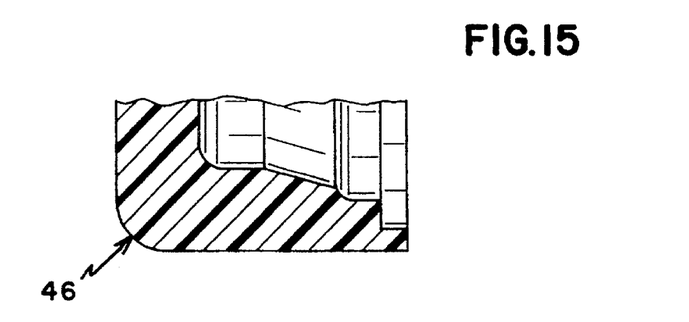
FIG. 15 is an enlarged partial view of the adaptor shown in FIG. 14.

Now referring to FIGS. 14 and 15, a cross-sectional view and an enlarged view of the fluid conduit adaptor 48 is shown. The male coupling member 44 is integrally welded to an inner surface of the fluid conduit adaptor 48. As with the female coupling member 42, the male coupling member 44 includes a flash trap 102 which provides good welded connection between the adaptor 48 and the male coupling member 44.

Figure 17:
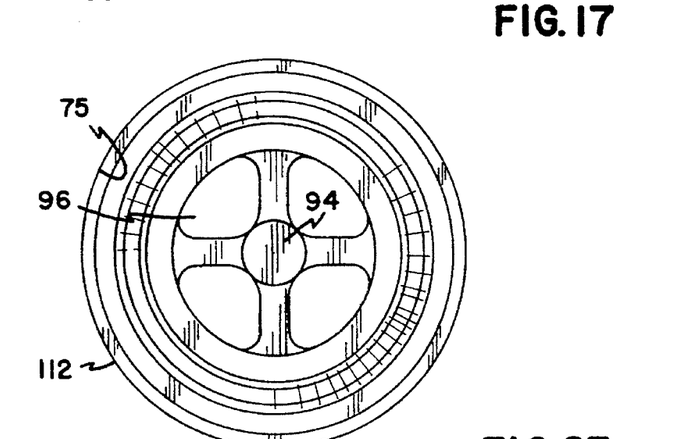
FIG. 17 is a back view of the male coupling member shown in FIG. 16.
Figure 18:
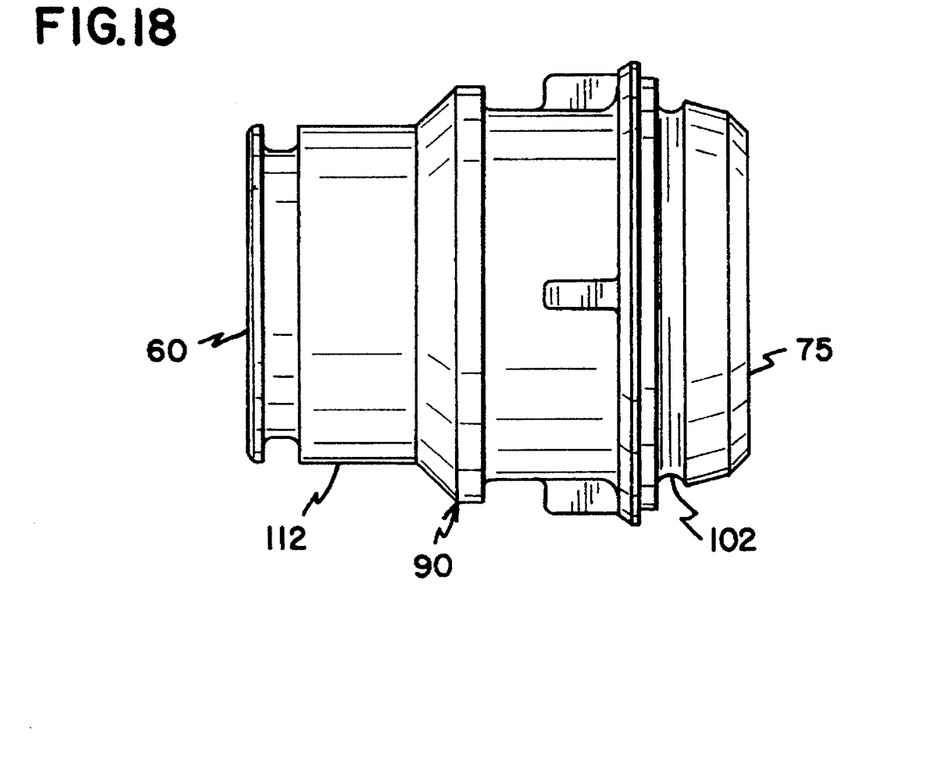
FIG. 18 is a side view of the male coupling member housing with the poppet member removed.
Figure 19:
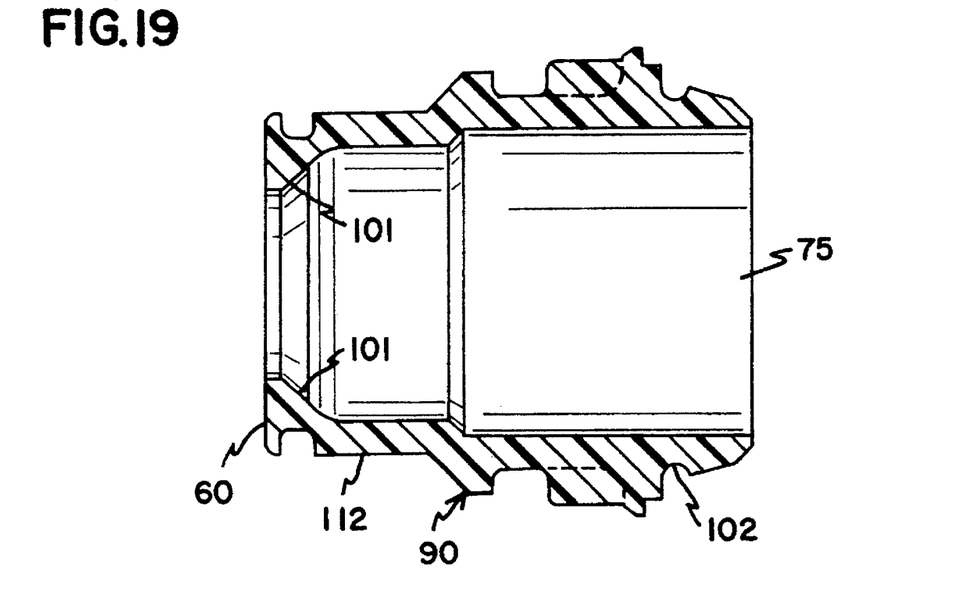
FIG. 19 is a cross-sectional view of the male coupling member housing with the poppet member removed as shown in FIG. 18.

Referring to FIGS. 16, 17, 18 and 19, FIG. 16 shows a side view of the male coupling member 44. The tip end 70 of the poppet member 64 projects from the housing 66. The cylindrical inclined wall 83 of the male coupling member 44 which corresponds to the cylindrical inclined wall 88 is disposed on an outer surface 112 of the male coupling member 44. No fluid is allowed to leak from the valve assembly 40 when the cylindrical inclined walls 88 and 90 are engaged with each other. FIG. 17 shows a back end view of the male coupling member 44. FIG. 18 shows a side view of the housing 66 of the male coupling member 44 with the poppet member 64 removed. FIG. 19 shows a cross-sectional view of FIG. 18.

Figure 20:
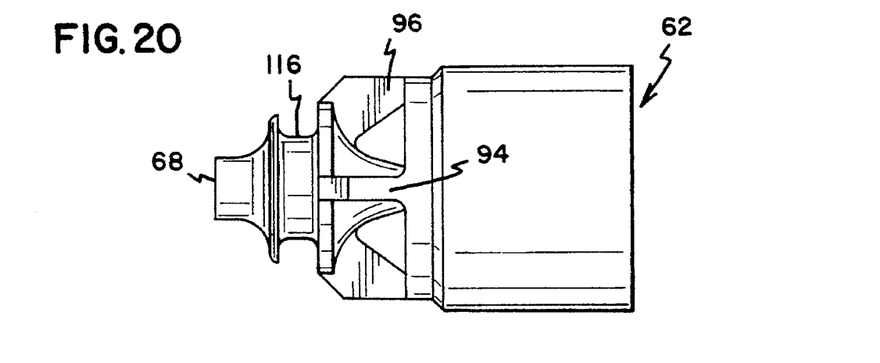
FIG. 20 is a side view of an embodiment of a poppet member.
Figure 21A:
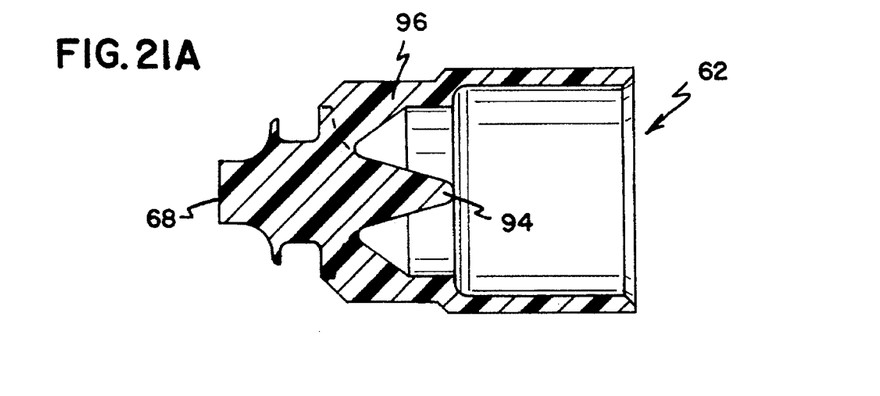
FIG. 21A is a cross-sectional view of the poppet member.
Figure 21B:
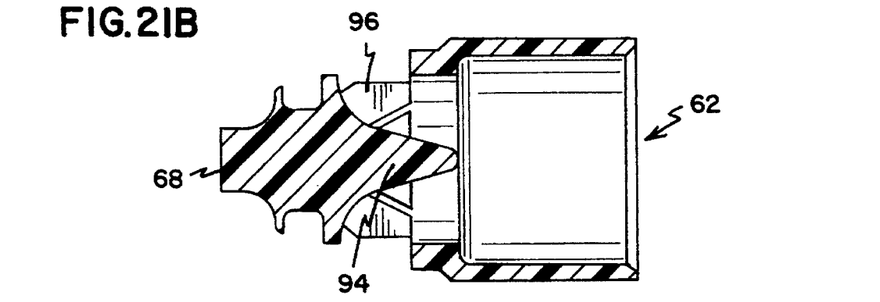
FIG. 21B is a cross-sectional view of the poppet member with a different view-angle from FIG. 21A.
Figure 22:
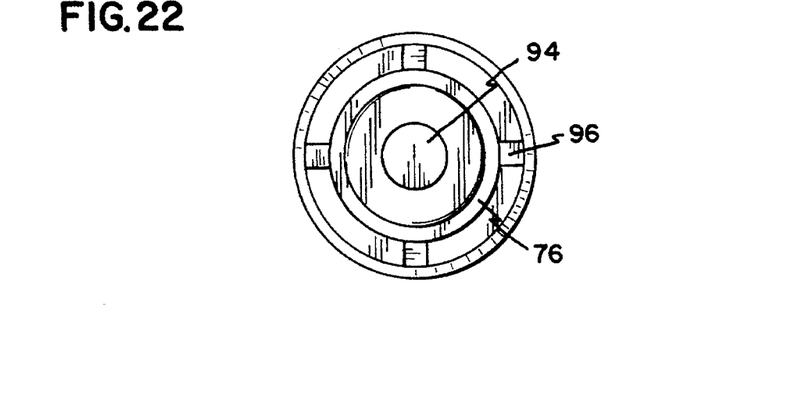
FIG. 22 is a front end view of the poppet member.
Figure 23:
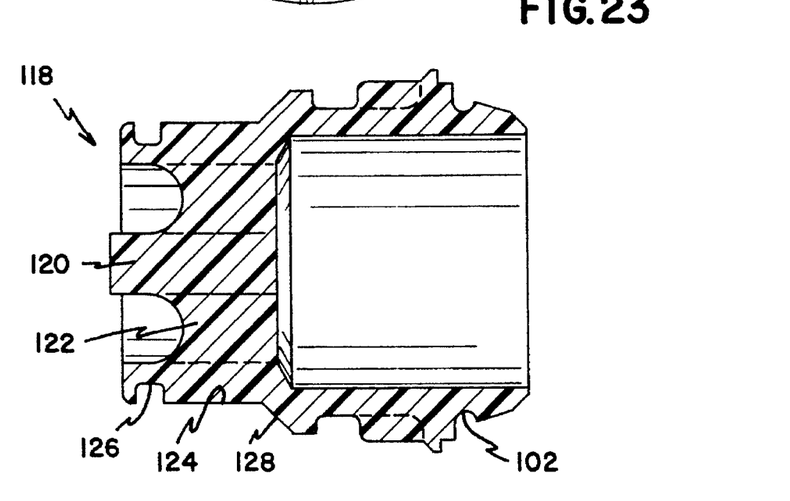
FIG. 23 is a cross-sectional view of an embodiment of a male coupling member having no poppet member.

Now referring to FIGS. 20, 21A, 21B and 22, a side view of the poppet member 62 or 64 is shown in FIG. 20. A groove 116 for retaining the o-ring 100 is disposed proximate the tip end 68 of the poppet member 62. FIGS. 21A,B show different view-angles of the cross-sectional views of the poppet member 62. FIG. 21B shows the view of 45 degrees turning from FIG. 21A. FIG. 22 shows a back end view of the poppet member 62.

Figure 24A:
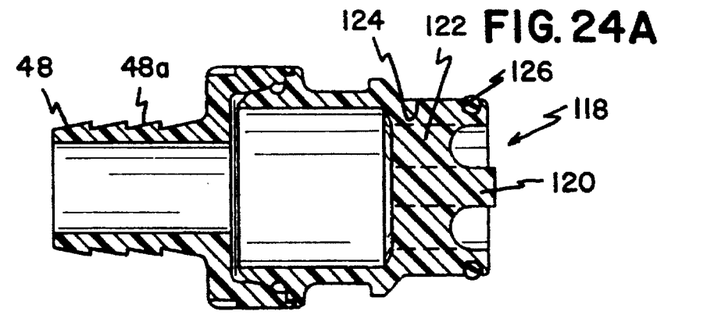
FIG. 24A is a cross-sectional view of the male coupling member shown in FIG. 23 having a first embodiment of a fluid conduit adaptor proximate one end.
Figure 24B:
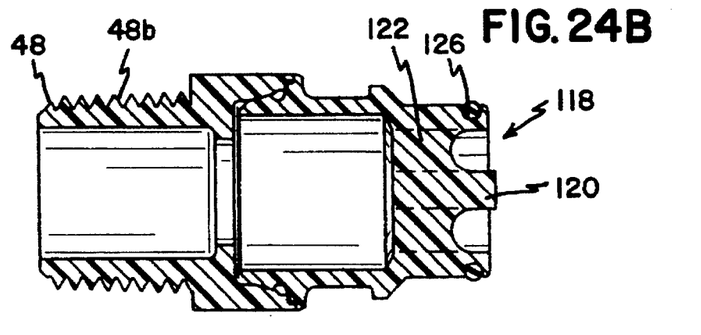
FIG. 24B is a cross-sectional view of the male coupling member shown in FIG. 23 having a second embodiment of a fluid conduit adaptor proximate one end.
Figure 24C:
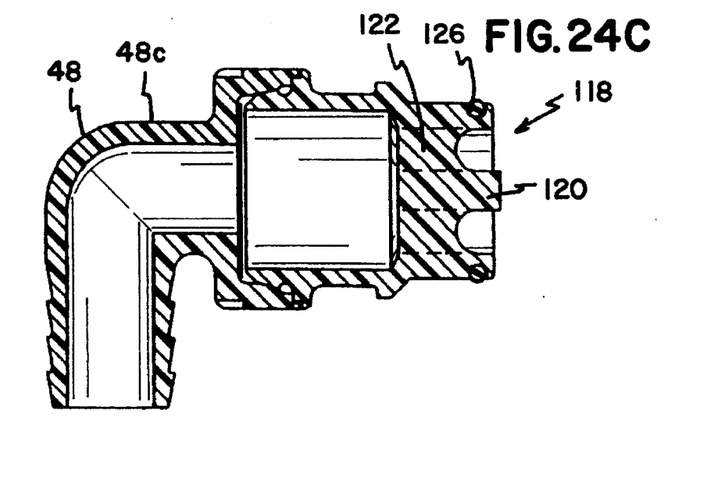
FIG. 24C is a cross-sectional view of the male coupling member having a third embodiment of a fluid conduit adaptor proximate one end.

Now referring to FIG. 23 and 24A–C, FIG. 23 shows a cross-sectional view of another embodiment of a male coupling member 118 having no reciprocally movable poppet member 62. A groove 126 is disposed on an outer surface 128 of the male coupling member 118 for receiving the o-ring 110. FIGS. 24A–C show cross-sectional views of the male coupling member 118 with three different fluid conduit adaptors 48. There is no poppet member 62 reciprocally received in the male coupling member 118. A tip end 120 is projected from cross-bars 122 which are disposed and integral with an inner surface 124 of the male coupling member 118. Thus, the fluid in the male coupling member 118 is allowed to pass through at any times. When the tip end 120 is engaged with the tip end 68 of the female coupling member 42, the fluid is allowed to flow through the male coupling member 44 and the female coupling member 42.

Figure 25:
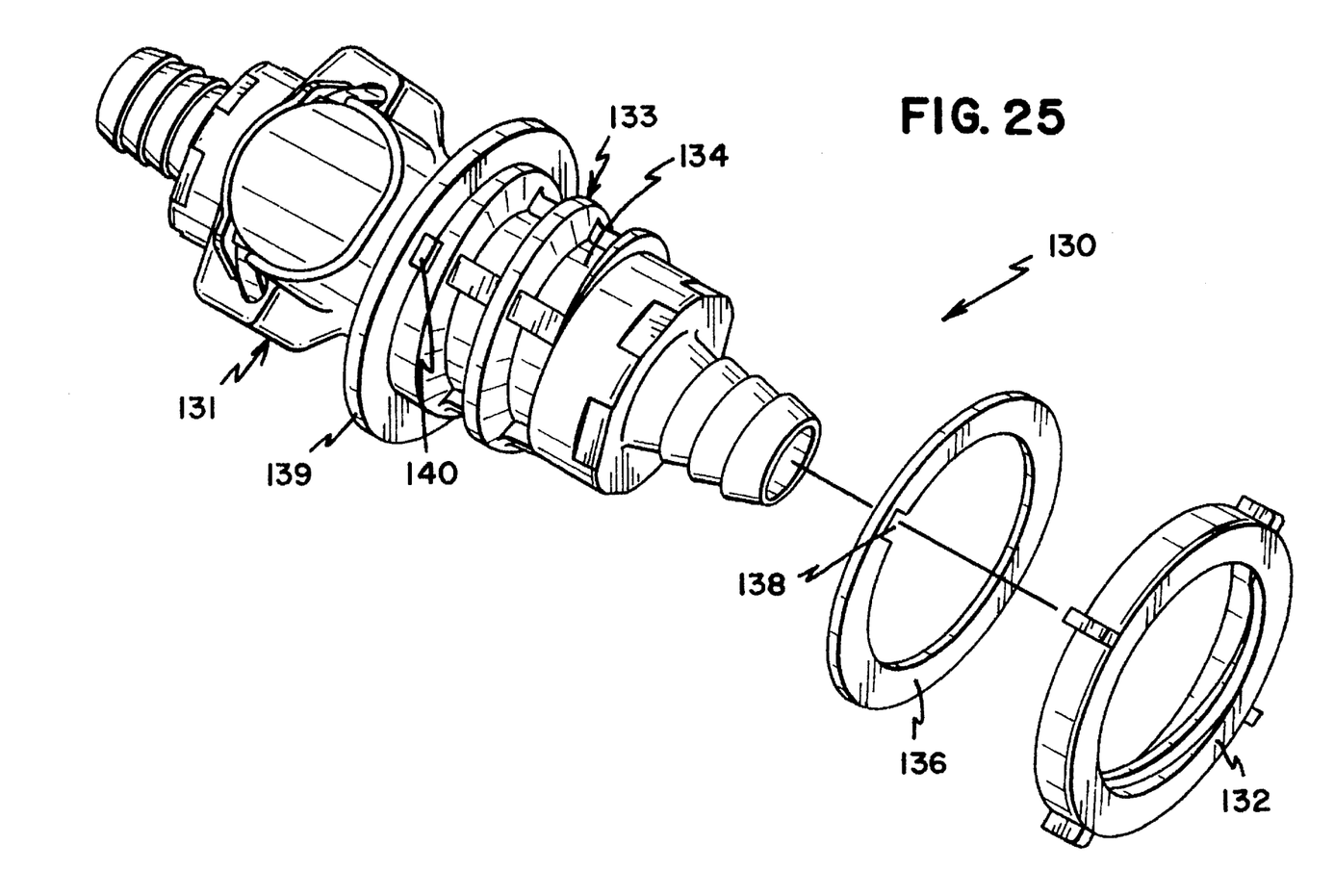
FIG. 25 is a perspective view of another embodiment of a quick connection coupling valve assembly.
Figure 26:
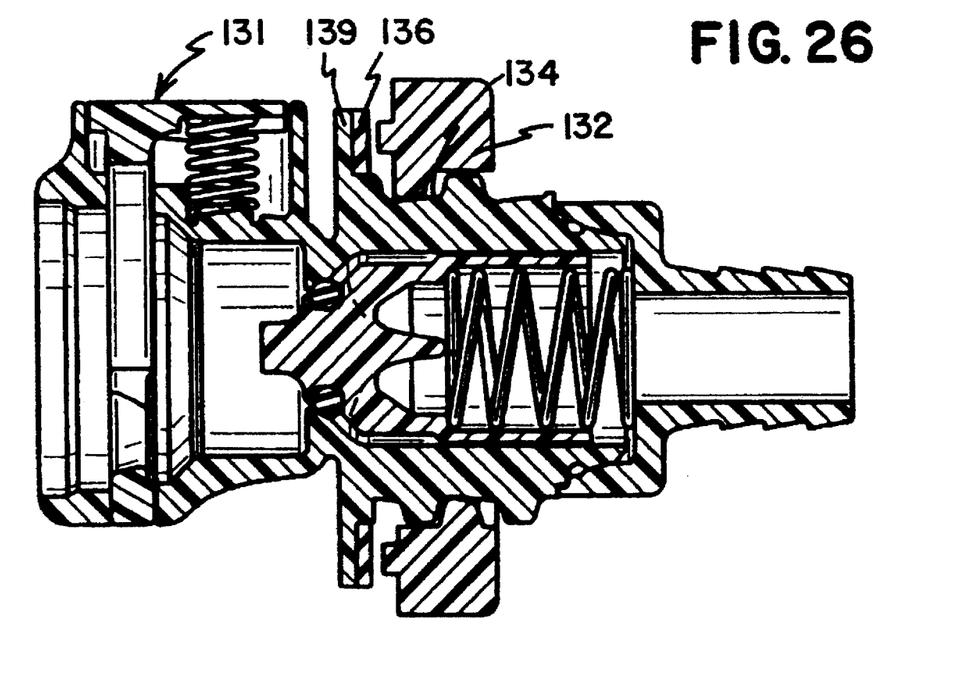
FIG. 26 is a cross-sectional view of the quick connection coupling valve assembly as shown in FIG. 25.

Referring to FIG. 25, a perspective view of another embodiment of the valve assembly 130 is shown. A female coupling member 131 of the valve assembly 130 is different from that of the valve assembly 40 in that the female coupling member has a different adaptor 133. This embodiment is particularly suited for mounting on panel or bulkhead. In this embodiment, a sleeve member 132 is threadedly mounted on a threaded helical groove 134. In the preferred embodiment, Dardelet threads are used so that the sleeve member 132 is self locking. A pad 136 having a recess 138 is disposed between the sleeve member 132 and a stop flange 139 which has a projection 140 received in the recess 138. Further, FIG. 26 shows a cross-sectional view of the female coupling member 131 shown in FIG. 25.

Figure 27A:
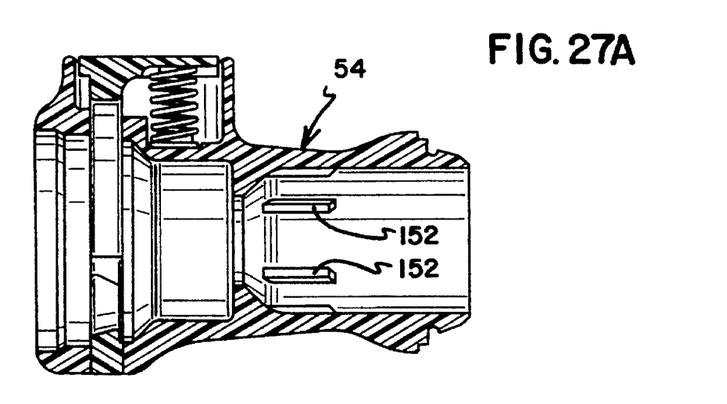
FIG. 27A is a cross-sectional view of an alternative embodiment of the female coupling member.
Figure 27B:
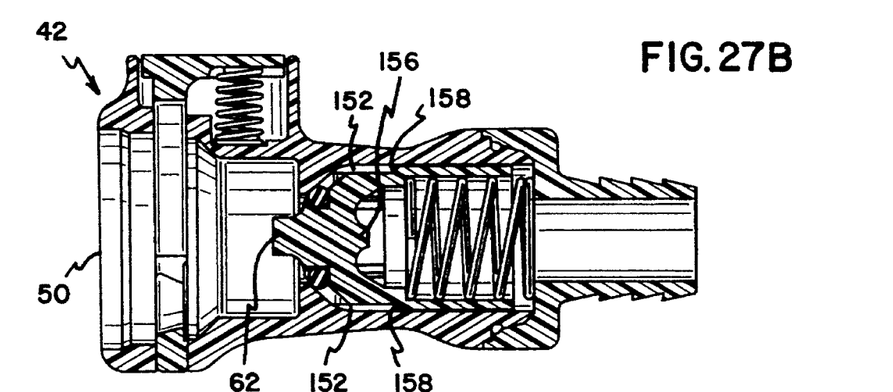
FIG. 27B is a cross-sectional view of the alternative embodiment of the female coupling member shown in FIG. 27A having a first embodiment of a fluid conduit adapter integrally welded to an end of the female coupling member.
Figure 28A:
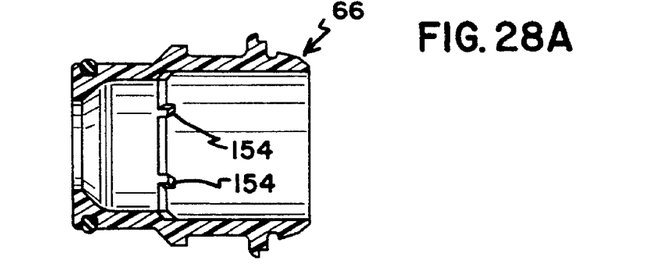
FIG. 28A is a cross-sectional view of an alternative embodiment of the male coupling member.
Figure 28B:
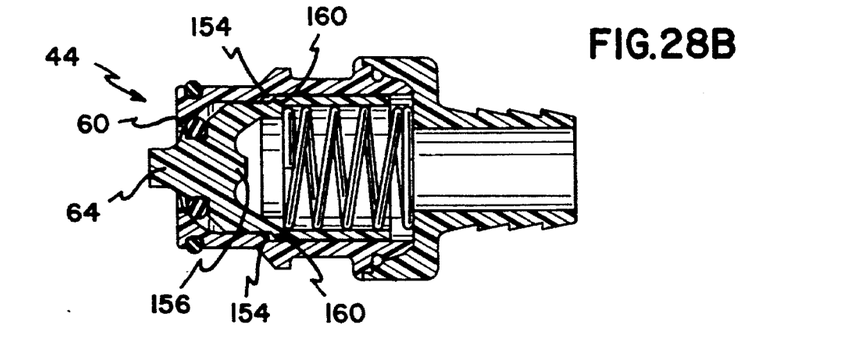
FIG. 28B is a cross-sectional view of the alternative embodiment of the male coupling member shown in FIG. 28A having a first embodiment of a fluid conduit adapter integrally molded to an end of the male coupling member.

Referring now to FIGS. 27A,B and 28A,B, there is shown an alternative embodiment of the valve assembly 40. In this embodiment, the female coupling member 42 and the male coupling member 44 have elongated stops 152, 154 respectively on an inside wall of the housings 54, 66. The stops 152, 154 limit movement of the poppet members 62, 64 respectively toward the front ends of their respective housings 54, 66 while allowing a fluid type seal to be formed by the o-rings 100. Accordingly, the o-rings 100 are protected not to be further squeezed so as to be easily worn out by a high fluid pressure toward the front ends 50,60. In addition, the poppet members 62, 64 respectively are shown as being truncated at 156 on the back side of the poppet members 62, 64.

The stops 152 of the female housing 54 are engaged with a shoulder 158 of the poppet member 62 when the poppet member 62 is pushed toward the front end 50 of the female housing 54. Thus, the stops 152 stop the further movement of the poppet member 62 toward the front end 50. The stops 154 of the male housing 66 are engaged with a shoulder 160 of the poppet member 64 when the poppet member 64 is pushed toward the front end 60 of the male housing 66. Thus, the stops 154 stop the further movement of the poppet member 64 toward the front end 60.

The truncated portion 156 of each of the poppet members 62, 64 provides small interference with fluid flow through the poppet members 62, 64 so that the fluid smoothly flows through the poppet members 62, 64.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A quick connection coupling valve assembly, comprising:

a male coupling member having a front end and a back end, the male coupling member including a housing which reciprocally receives a first poppet member therein and defines a fluid passageway therethrough, the first poppet member being axially movable between an open position and a closed position, the first poppet member having a tip end normally projecting from a front end of the housing when in the closed position, a spring member being compressedly disposed between a back end of the housing and the first poppet member to bias the first poppet member into the closed position, the back end of the male coupling member being connectable to a fluid conduit;

a female coupling member having a front end and a back end, the female coupling member including a housing defining a fluid passageway therethrough having first and second housing portions, the first housing portion reciprocally receiving a second poppet member and the second housing portion receiving the first end of the male coupling member, the second poppet member being axially movable between an open position and a closed position, said second poppet member having a tip end normally projecting from a front end of the first housing portion when in the closed position, a spring member being compressedly disposed between a back end of the first housing portion and the second poppet member to bias the second poppet member into the closed position, the back end of the female coupling member being connectable to a fluid conduit;

a first o-ring is disposed on an outer surface at a front end of the first poppet member and forms a fluid tight seal between the first poppet member and the male coupling housing when the male coupling member is disengaged from the female coupling member;

a second o-ring is disposed on an outer surface at a front end of the second poppet member and forms a fluid tight seal between the second poppet member and the female coupling housing when the male coupling member is disengaged from the female coupling member;

the first and second o-rings forming a maximum diameter at the tip end of the first and second poppet members over which fluid flow is guided; and clip means proximate the front end of the female coupling member for releasably locking the male coupling member in the female coupling member.

2. A quick connection coupling valve assembly in accordance with claim 1, wherein the first and second poppet members each further includes a cylindrical portion where the spring member is received, the spring member being disposed in each of the first and second poppet members such that fluid flow is only through the center of the spring member.

3. A quick connection coupling valve assembly in accordance with claim 1, wherein a first adaptor is welded to the back end of the housing of the male coupling member, and a second adaptor is welded to the back end of the first housing portion of the female coupling member, at least one flash trap is disposed between one end of the first adaptor and the back end of the male coupling member, and at least one flash trap is disposed between one end of the second adaptor and the back end of the female coupling member the major mating surfaces of the adaptors and the coupling members being bevelled to facilitate movement of flash to the trap.

4. A quick connection coupling valve assembly in accordance with claim 1, wherein the clip means includes a one piece clip member and a clip spring member which is disposed between a surface of the female coupling member and a bottom surface of a tab portion of the clip member, the clip spring member being enclosed by the tab portion and at least one vertical wall of the female coupling member.

5. A quick connection coupling valve assembly in accordance with claim 4, wherein the clip member is made of a plastic material.

6. A quick connection coupling valve assembly in accordance with claim 5, wherein the clip member includes a lower edge having an inclined surface on a side facing the male coupling member and a vertical surface on a side facing away from the male coupling member, the male coupling member having a circumferential flange having an inclined surface on a side facing the female coupling member and a vertical surface on a side facing away from the female coupling member.

7. A quick connection coupling valve assembly in accordance with claim 1, wherein the tip end of the first poppet member of the male coupling member is aligned with the tip end of the second poppet member of the female coupling member.

8. A quick connection coupling valve assembly in accordance with claim 7, wherein the tip ends of the first and second poppet members are engageable with each other to open fluid passageways of the male coupling member and the female coupling member when the valve assembly is locked by the clip means.

9. A quick connection coupling valve assembly in accordance with claim 7, wherein the tip ends of the first and second poppet members are disengaged from each other to close the fluid passageways of the male coupling member and the female coupling member when the male coupling member is disconnected from the female coupling member.

10. A quick connection coupling valve assembly in accordance with claim 1, wherein a third o-ring is disposed on an outer surface at the front end of the male coupling member and forms a fluid tight seal between the male coupling member and the female coupling member.

11. A quick connection coupling valve assembly in accordance with claim 1, further including a spring activated clip.

12. A quick connection coupling valve assembly in accordance with claim 1, wherein the first poppet member and the second poppet member each including a truncated member disposed on a back side end, the truncated member tapering axially away from the back side end.

* * * * *